United States Patent
Krotsch et al.

(10) Patent No.: US 11,552,535 B2
(45) Date of Patent: Jan. 10, 2023

(54) DEVICE FOR REDUCING HARMFUL BEARING VOLTAGES

(71) Applicant: ebm-papst Mulfingen GmbH & Co. KG, Mulfingen (DE)

(72) Inventors: Jens Krotsch, Niederstetten (DE); Sebastian Schroth, Kupferzell (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 276 days.

(21) Appl. No.: 16/768,534

(22) PCT Filed: Dec. 19, 2018

(86) PCT No.: PCT/EP2018/086010
§ 371 (c)(1),
(2) Date: May 29, 2020

(87) PCT Pub. No.: WO2019/122032
PCT Pub. Date: Jun. 27, 2019

(65) Prior Publication Data
US 2020/0321835 A1 Oct. 8, 2020

(30) Foreign Application Priority Data
Dec. 20, 2017 (DE) .................... 10 2017 130 647.1

(51) Int. Cl.
*H02K 11/00* (2016.01)
*H02K 11/26* (2016.01)
*H02K 11/02* (2016.01)

(52) U.S. Cl.
CPC ............ *H02K 11/26* (2016.01); *H02K 11/02* (2013.01); *H02K 2213/03* (2013.01)

(58) Field of Classification Search
CPC ..... H02K 11/26; H02K 11/02; H02K 2213/03
See application file for complete search history.

(56) References Cited

U.S. PATENT DOCUMENTS

| 2003/0057783 A1 | 3/2003 | Melfi |
| 2003/0086630 A1* | 5/2003 | Bramel .................. H02K 11/40 384/476 |

(Continued)

FOREIGN PATENT DOCUMENTS

| DE | 10 2004 016 738 B3 | 4/2004 |
| DE | 10 2004 016 738 B3 | 11/2005 |

(Continued)

OTHER PUBLICATIONS

German Examination Report dated May 20, 2021, which issued in the corresponding German Patent Application No. 18 826 343.8.

(Continued)

*Primary Examiner* — Thomas Truong
(74) *Attorney, Agent, or Firm* — Dickinson Wright PLLC

(57) ABSTRACT

The invention relates to a device for reducing harmful bearing voltages in an electrical machine (M) fed by a DC link voltage of a DC link, said electrical machine comprising a stator (3), which has windings (7) and is insulated from ground (GND), and a rotor (2) and a motor shaft, wherein furthermore a rotor-side bearing ($LA_R$) and a stator-side bearing ($LA_S$) are each insulated from the ground (GND) and the rotor (2) and the stator (3) are electrically connected to each other by means of a bypass capacitance ($C_{Bypass}$) having a predefined capacitance.

9 Claims, 2 Drawing Sheets

(56) References Cited

U.S. PATENT DOCUMENTS

2008/0088187 A1      4/2008  Shao et al.
2011/0043071 A1*     2/2011  Mizukami ................ H02K 1/30
                                                        310/216.121
2016/0329780 A1*    11/2016  Reed .................. H02K 11/0094

FOREIGN PATENT DOCUMENTS

| DE | 10 2013 223 673 A1 | 6/2015  |
| DE | 20 2015 1 03 902 U1 | 9/2015  |
| DE | 10 2014 210 538 A1 | 12/2015 |
| DE | 10 2015 112 146 A1 | 1/2017  |
| DE | 20 2017 103 248 U1 | 8/2017  |
| EP | 1 445 850 A1       | 8/2004  |

OTHER PUBLICATIONS

International Search Report and Written Opinion dated Mar. 22, 2019, which issued in corresponding PCT Patent Application No. PCT/EP2018/086010.

German Examination Report dated Jan. 26, 2018, which issued in the corresponding German Patent Application No. 10 2017 130 647.1.

* cited by examiner

DEVICE FOR REDUCING HARMFUL BEARING VOLTAGES

The present invention relates to a device for reducing unwanted bearing voltages in an electrical machine having insulated bearings and insulated stator cores.

Today, variable-speed motors are predominantly fed by DC link voltage converters. However, feed by the DC link voltage converter can lead to unwanted bearing voltages which in turn result in damaging bearing currents in the bearings of the motor. In electrical machines having rolling and sliding bearings, such a flow of current through the bearings can lead to damage or even total failure.

Motors not having insulated stator cores, are equipped with slip rings or shaft capacitors, for example, which help to reduce the bearing voltage. These are connected between a grounded housing and the shaft of the rotor. By means of slip rings or the shaft capacitor, a capacitive connection between the rotor and ground potential can be established.

Further remedial measures are known in the prior art. For example, documents EP 1 445 850 A1 and DE 10 2004 016 738 B3 teach the use of a device for protecting a bearing of an electrical machine, providing a compensation arrangement or compensation device for generating a compensation current for compensating an interference current through the bearings.

As an alternative remedy, current-insulated or electrically insulating bearings, e.g., bearings with a ceramic insulation on the outer race or hybrid bearings with ceramic rolling elements, were used for this purpose in the past. Nevertheless, when using insulated bearings and insulated stator cores, in particular those overmolded in an insulating manner, at the same time, taking into account high frequency stators connected in an undefined manner, there is an unwanted bearing voltage which must be avoided.

Therefore, the object of the invention is to overcome the above problems and provide a solution by which the unwanted bearing voltages and resulting bearing currents can be effectively reduced in electrical machines having insulated bearings and insulated stator cores at the same time.

This object is achieved by means of a device having the features of claim 1.

The basic idea of the invention is that an impedance is connected between the rotor and the stator or the outer bearing race in a targeted manner, the level of which corresponds to a multiple of the bearing capacitance, the outer bearing races and the stator being constructed in an insulated manner.

The concept of connecting the rotor to the stator core (the outer bearing race being constructed such as to be insulated from the stator core and therefore insulated from ground) represents an improvement over the prior art in terms of protecting the insulated bearings.

By means of modern production methods, it is preferred to provide for overmolding of stator cores in low-power motors. Thereby, insulation of the motor's stator cores relative to the outer bearing race (LA) is achieved. The potential thus applied to the stator cores increases significantly due to a common-mode change at the terminals of the motor relative to the ground potential.

As such, the rotor itself also has a capacitive coupling relative to ground. It is only slightly modified when overmolding the stator, the rotor thereby continuing to retain its potential. For high-capacitance attachments on the rotor, the rotor potential is then significantly lower than the stator potential close to ground potential.

According to the invention, the impedance between the rotor and the stator is to be reduced, for example by means of a bypass capacitance arranged therebetween. Due to this measure, the potentials between the stator and the rotor equalize if correctly dimensioned, and the voltage applied to the rotor-side and stator-side bearings decreases.

If the capacitance of the bypass capacitor between the outer bearing race and the shaft or the rotor conductively connected thereto is increased, the BVR ratio (bearing voltage ratio) of the motor significantly increases with stator cores at a common potential (i.e., connected to a common potential) or grounded stator cores. If, on the other hand, the motor has insulated or overmolded stator cores, then the BVR decreases, whereby a reduction in bearing voltage is achieved. In this case, a bearing seat is assumed which is insulated relative to the rotor or the stator cores.

Due to the use of electric motors in a wide variety of applications, the rotor-ground capacitance ($C_{RE}$) significantly varies accordingly. Thus, in applications with metallic attachments on the rotor, there is a high rotor-ground capacitance ($C_{RE}$), while in attachments with plastic or insulating materials, for example, there is a low rotor-ground capacitance ($C_{RE}$).

In an advantageous design of the invention, the configuration of the bypass capacitor is to be implemented by means of discretely constructed capacitors and by means of connection to the shaft.

A preferred way to achieve this is to electrically connect the capacitors to the shaft by means of slip rings or brushes, since they do not establish any interfering galvanic, but only a capacitive coupling during rotation.

In order to maintain the insulating properties of the motor, it is conceivable to electrically connect a Y capacitor with sufficient insulation strength on one side to the stator core, while the other side of the capacitor is connected to a shaft contact ring or shaft capacitor. In this case, the shaft contact can be established by contacting microfiber brushes which rub on the shaft, for example. For contact to the shaft, there can be both a galvanically conductive connection and a capacitive connection (due to a free-brushing process) of the microfiber brushes.

In a further advantageous embodiment of the invention, preferably when applied in external rotor motors, the bypass capacitor can also be implemented by means of dielectrics between the insulated stator and the shaft.

In a similarly advantageous embodiment of the invention, it can be provided that by increasing the parasitic couplings between the bearings and ground, the method is optimized for larger rotor-ground capacitances ($C_{RE}$).

Advantageous further developments of the invention are characterized in the dependent claims or are presented in detail below along with the description of the preferred implementation of the invention with reference to the figures.

In the drawings.

In the following, the invention will be described in more detail based on preferred exemplary embodiments with reference to FIGS. 1 to 3, wherein like reference numerals refer to the same functional and/or structural features.

Figure 1:
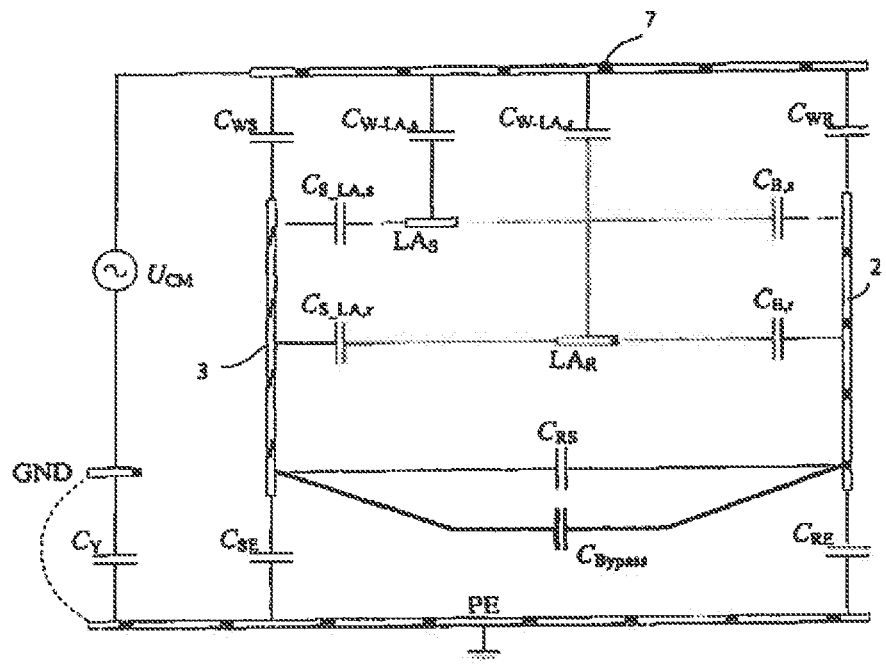
FIG. 1 shows an equivalent circuit diagram of the capacitance network for an exemplary embodiment of the invention.

FIG. 1 shows an equivalent circuit diagram for an electric motor of an exemplary embodiment of the invention. The equivalent circuit diagram shown represents the capacitance network for the corresponding implementations with the system-related capacitances $C_{ws}$, $C_{W-LAs}$, $C_{W-LAr}$, $C_{WR}$, $C_{BS}$, $C_{BR}$, $C_{RS}$, $C_{RE}$, $C_{SE}$, $C_Y$, $C_{S-LAS}$, $C_{s-LAr}$, in each case representing, by way of example, the capacitances between W=winding, LA=outer bearing race (r=rotor side, s=stator side), R=rotor and S=stator as well as further capacitances between the respective components of the motor, which, however, will not be discussed in greater detail. Furthermore, the potential PE of the protective earth in the network is shown, as well as the ground reference potential GND and the common-mode voltage $U_{CM}$. The motor winding is denoted by reference numeral 7.

According to the invention, rotor 2 and stator 3 are electrically connected to one another via a bypass capacitor $C_{Bypass}$, whereby the potentials between rotor 2 and stator 3 are adapted to one another, and consequently, the voltage applied to rotor-side bearing $LA_R$ and stator-side bearing $LA_S$ respectively decreases.

Figure 2:
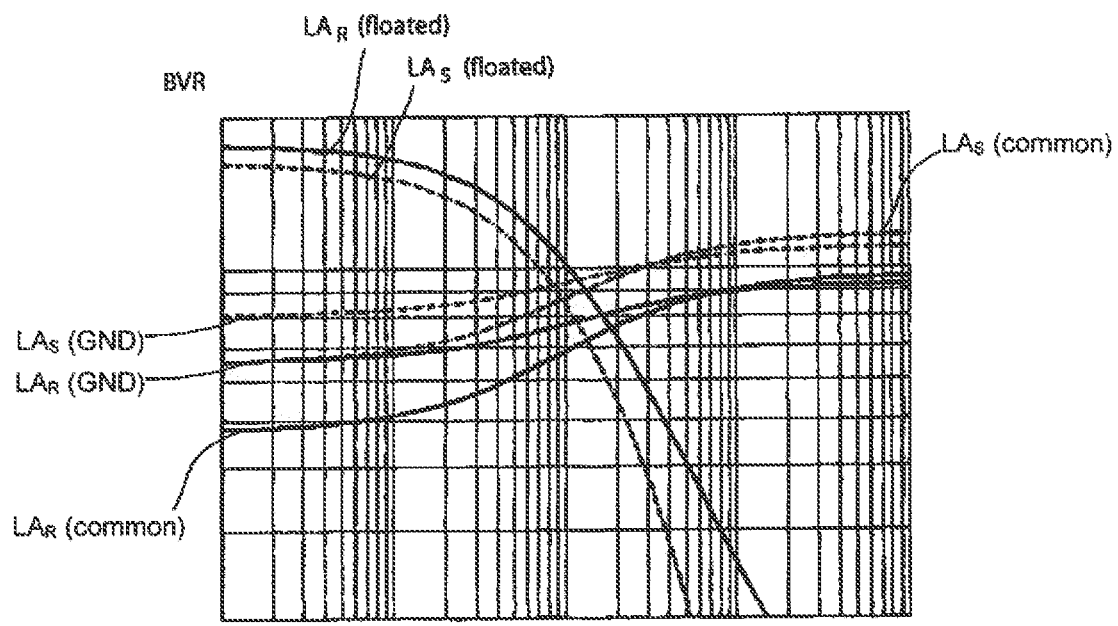
FIG. 2 shows an illustration of the BVR for a floating stator, a stator at common potential and a grounded stator for the rotor-side and the stator-side bearings.

For an evaluation of the effect of a bypass capacitor, as shown in FIG. 2, the capacitance of the bypass capacitor is first varied between 1 pF and 10 nF and the BVR (bearing voltage ratio), i.e., the ratio of the applied common-mode voltage $U_{CM}$ to the voltage at the bearing for both rotor-side bearing $LA_R$ and the stator-side one $LA_S$, is determined. The results are shown as a solid line for rotor-side bearing $LA_R$ and as a dashed line for stator-side bearing $LA_S$. Thus, if bypass capacitor $C_{Bypass}$ is increased between the respective bearing $LA_R$, $LA_S$ and the motor shaft or rotor 2 conductively connected thereto, the BVR of the stator 3 connected to common potential or ground significantly increases, that of rotor 2 with the insulated bearing seat significantly decreasing in case of a sufficiently large bypass capacitor $C_{Bypass}$, achieving a reduction in bearing voltage.

Figure 3:
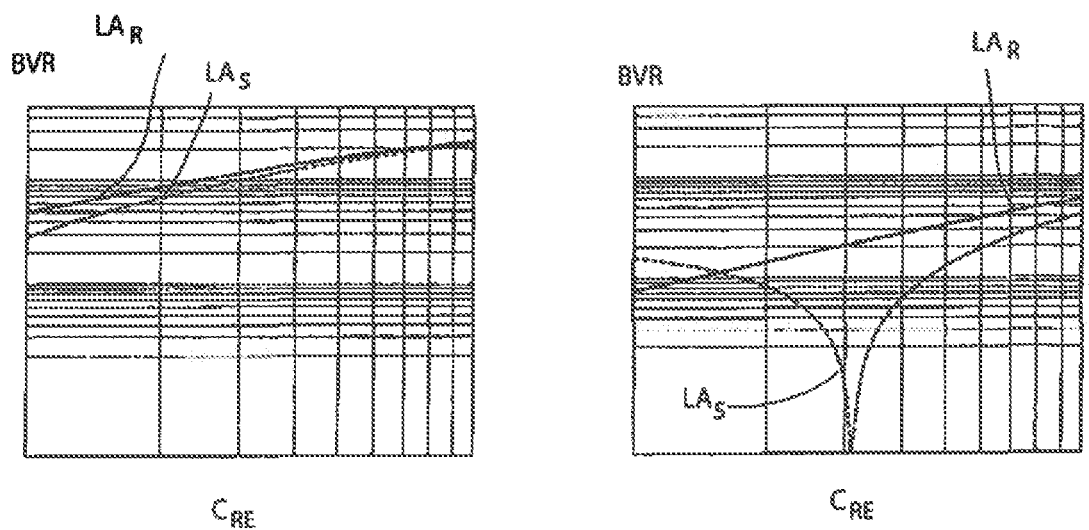
FIG. 3 shows the BVR ratio with a varying rotor-ground capacitance without the bypass capacitor on the left side of the illustration and with a bypass capacitor on the right side of the illustration next to it.

FIG. 3 shows the relationship of the BVR ratio with a varying rotor-ground capacitance $C_{RE}$, namely without a bypass capacitor $C_{Bypass}$ on the left side of the illustration and with a bypass capacitor $C_{Bypass}$ on the right side of the illustration next to it.

The invention claimed is:

1. A device for reducing harmful bearing voltages in an electrical machine (M) fed by a DC link voltage of a DC link, said electrical machine comprising a stator (3), which has windings (7) and is insulated from ground (GND), and a rotor (2) and a motor shaft, wherein furthermore a rotor-side bearing ($LA_R$) and a stator-side bearing ($LA_S$) are each insulated from the ground (GND) and the rotor (2) and the stator (3) are electrically connected to each other by means of a bypass capacitance ($C_{Bypass}$) having a predefined capacitance, wherein the bypass capacitance ($C_{Bypass}$) is implemented by introducing a bypass capacitor between the rotor (2) and the stator (3).

2. The device according to claim 1, characterized in that a level of the bypass capacitance ($C_{Bypass}$) corresponds to a multiple of the bearing capacitance.

3. The device according to claim 1, characterized in that the bypass capacitance ($C_{Bypass}$) is implemented by introducing a dielectric between the rotor (2) and the stator (3).

4. The device according to claim 1, characterized in that the implementation of the bypass capacitance ($C_{Bypass}$) is accomplished by means of discretely constructed capacitors.

5. The device according to claim 1, characterized in that the bypass capacitor is electrically connected to the motor shaft via slip rings or brushes.

6. The device according to claim 1, characterized in that a Y capacitor with sufficient insulation strength is connected to one side of a stator core of the stator (3) and a shaft contact ring or shaft capacitor is connected to the other side of the stator core of the stator (3).

7. The device according to claim 6, characterized in that the configuration of the shaft contact ring or shaft capacitor is such that it also has a capacitance relative to the motor shaft.

8. A method of configuring the capacitance of a bypass capacitor in a device according to claim 1, in which the common-mode voltage $U_{CM}$ is applied, having the following steps:
    a) varying the bypass capacitance ($C_{Bypass}$) starting from a lower capacitance to a capacitance increased relative thereto;
    b) identifying the BVR ratio of the common-mode voltage $U_{CM}$ applied to the voltage at the bearing both for the rotor-side bearing $LA_R$ and for the stator-side bearing $LA_S$;
    c) determining that value of the bypass capacitance ($C_{Bypass}$) at which the BVR ratio exceeds a predetermined setpoint, the capacitance corresponding thereto being selected and used as a bypass capacitance ($C_{Bypass}$) for the device.

9. The device according to claim 1, wherein the electrical machine is characterized by a system-related capacitance $C_{RS}$ between the rotor and the stator, and the rotor bypass capacitance ($C_{Bypass}$) is in addition to and parallel with the system-related capacitance $C_{RS}$.

* * * * *